(12) United States Patent
Lehmann et al.

(10) Patent No.: US 8,158,724 B2
(45) Date of Patent: Apr. 17, 2012

(54) CURABLE COMPOSITIONS FOR ADVANCED PROCESSES, AND PRODUCTS MADE THEREFROM

(75) Inventors: Stanley L. Lehmann, Martinez, CA (US); Wei Helen Li, San Ramon, CA (US); Raymond S. Wong, San Ramon, CA (US)

(73) Assignee: Henkel Corporation, Rocky Hill, CT (US)

( * ) Notice: Subject to any disclaimer, the term of this patent is extended or adjusted under 35 U.S.C. 154(b) by 116 days.

(21) Appl. No.: 12/729,612

(22) Filed: Mar. 23, 2010

(65) Prior Publication Data

US 2010/0261395 A1 Oct. 14, 2010

Related U.S. Application Data

(62) Division of application No. 10/569,147, filed as application No. PCT/US2004/025280 on Aug. 5, 2004, now Pat. No. 7,709,579.

(51) Int. Cl.
*C08L 39/04* (2006.01)
*C08F 126/06* (2006.01)
*C08G 73/06* (2006.01)
*B28B 1/14* (2006.01)

(52) U.S. Cl. ..... 525/203; 525/205; 525/206; 525/330.9; 528/422; 528/423; 264/299

(58) Field of Classification Search ................. 525/203, 525/205, 206, 330.9; 528/422, 423; 264/299
See application file for complete search history.

(56) References Cited

U.S. PATENT DOCUMENTS 6,620,905 B1 * 9/2003 Musa .............................. 528/423
2003/0018131 A1 * 1/2003 Davis et al. .................... 525/107

* cited by examiner

*Primary Examiner* — Duc Truong
(74) *Attorney, Agent, or Firm* — Steve C. Bauman

(57) ABSTRACT

Curable compositions, such as benzoxazine-based ones, are useful in applications within the aerospace industry, such as for example as a heat curable composition for use as a matrix resin in advanced processes, such as resin transfer molding, vacuum assisted transfer molding and resin film infusion, and their use in such advanced processes form the basis of the present invention.

40 Claims, No Drawings

CURABLE COMPOSITIONS FOR ADVANCED PROCESSES, AND PRODUCTS MADE THEREFROM

RELATED U.S. APPLICATION DATA

This application is a division of U.S. patent application Ser. No. 10/569,147, filed on Feb. 21, 2006 now U.S. Pat No. 7,709,579 which is the national phase filing of International Patent Application No. PCT/US2004/25280, filed Aug. 5, 2004, which claims priority to U.S. patent application Ser. No. 10/642,325, filed on Aug. 18, 2003, the contents of all which are incorporated herein by reference.

BACKGROUND OF THE INVENTION

1. Field of the Invention

Curable compositions, such as benzoxazine-based ones, are useful in applications within the aerospace industry, such as for example as a heat curable composition for use as a matrix resin in advanced processes, such as resin transfer molding, vacuum assisted transfer molding and resin film infusion, and their use in such advanced processes form the basis of the present invention.

2. Brief Description of Related Technology

Epoxy resins with various hardeners have been used extensively in the aerospace industry, both as adhesives and as matrix resins for use in prepreg assembly with a variety of substrates.

Blends of epoxy resins and benzoxazines are known. See e.g. U.S. Pat. No. 4,607,091 (Schreiber), U.S. Pat. No. 5,021,484 (Schreiber), U.S. Pat. No. 5,200,452 (Schreiber), and U.S. Pat. No. 5,445,911 (Schreiber). These blends appear to be potentially useful in the electronics industry as the epoxy resins can reduce the melt viscosity of benzoxazines allowing for the use of higher filler loading while maintaining a processable viscosity. However, epoxy resins oftentimes undesirably increase the temperature at which benzoxazines polymerize.

Ternary blends of epoxy resins, benzoxazines and phenolic resins are also known. See U.S. Pat. No. 6,207,786 (Ishida), and S. Rimdusit and H. Ishida, "Development of new class of electronic packaging materials based on ternary system of benzoxazine, epoxy, and phenolic resin," *Polymer*, 41, 7941-49 (2000).

Resin transfer molding ("RTM") is a process by which a resin—conventionally and predominately, epoxy-based resin systems and maleimide-based systems—is pumped at low viscosities and under pressure into a closed mold die set containing a preform of dry fabric. The resin infuses into the preform to make a fiber-reinforced composite article. The RTM process can be used to produce at low cost composite parts that are complex in shape. These parts typically require continuous fiber reinforcement along with inside mold line and outside mold line controlled surfaces.

Fiber-reinforced composite articles may be manufactured from vacuum assisted resin transfer molding ("VaRTM"), like RTM. In contrast to RTM, VaRTM employs an open mold and places the system under a vacuum to assist the resin infusion process.

Resin film infusion ("RFI"), like RTM, infuses a resin into a preform placed in a mold. Here, however, the resin is in the form of a film, which is placed in the mold together with the preform. U.S. Pat. No. 5,902,535 speaks to RFI molds and processes, and is expressly incorporated herein by reference.

The matrix resin used in the RTM and VaRTM advanced prossesses should desirably have a low injection viscosity to allow complete wetting and infusion of the preform.

Bismaleimide-based resins for RTM and RFI processes are known, and examples of which are described in U.S. Pat. Nos. 5,955,566 and 6,313,248.

And, two component epoxy resin compositions have been used, where the epoxy resin and the hardener components are combined immediately prior to use. One component epoxy resin compositions oftentimes must be stored at controlled low temperatures to prevent premature cross-linking reactions and to extend storage life. Otherwise, the viscosities of such one component epoxy resin compositions would build far too quickly, thus rendering their working life unsuitable (or at least not desirable) from a commercial standpoint.

Notwithstanding the state of the technology, there is a need for other resin systems to be used in these advanced processes, particularly a resin system with improved performance properties. And to date there has been no disclosure, teaching or suggestion to prepare a heat curable composition either as a matrix resin or in film form based on benzoxazine-containing compositions for these advanced processes.

SUMMARY OF THE INVENTION

The present invention relates to a process for producing composite articles in advanced processes, such as RTM, VaRTM and RFI systems, using a benzoxazine-containing heat curable composition.

The present invention thus provides in one aspect thereof a RTM process, steps of which include:

(a) providing a heat curable composition into a closed mold containing a preform;

(b) exposing the interior of the mold to a first elevated temperature and elevated pressure sufficient to wet the preform with the heat curable composition; and (c) curing the heat curable composition-impregnated preform within the mold at a second elevated temperature to form a RTM product.

In another aspect, there is provided a VaRTM process, steps of which include:

providing a preform into a mold;

providing a heat curable composition into the mold under a first elevated temperature and under vacuum for a time sufficient to allow the composition to wet the preform; and exposing the mold containing the composition wetted-preform to a second elevated temperature while under vacuum sufficient to cure the heat curable composition-wetted preform within the mold to form a VaRTM product.

In yet another aspect, there is provided a RFI process, steps of which include:

providing a preform into a closed mold containing a heat curable composition in film form;

exposing the interior of the mold to a first elevated temperature and optionally vacuum, while the exterior of the mold is exposed to an elevated pressure, for a time sufficient to infuse the preform with the heat curable composition; and curing the heat curable composition-infused preform within the mold at a second elevated temperature to form a RFI product.

In each of these processes, the heat curable composition comprises (i) a benzoxazine component.

Of course, the invention provides products made by these advanced processes.

In still another aspect, the invention provides a binder composition, which is useful in both the RTM and VaRTM processes. The inventive binder composition is partially cured by exposure to elevated temperature conditions over time sufficient to increase the melting point higher than the temperature at which a matrix resin composition is to be infused into a preform and lower than the point at which the partially cured binder composition and the matrix resin composition are miscible.

The present invention will be more fully understood by a reading of the following detailed description of the invention.

DETAILED DESCRIPTION OF THE INVENTION

As noted above, provides in one aspect thereof a RTM process, steps of which include:

(a) providing a heat curable composition into a closed mold containing a preform;

(b) exposing the interior of the mold to a first elevated temperature and elevated pressure sufficient to wet the preform with the heat curable composition; and (c) curing the heat curable composition-impregnated preform within the mold at a second elevated temperature to form a RTM product.

In another aspect, there is provided a VaRTM process, steps of which include:

(a) providing a preform into a mold;

(b) providing a heat curable composition into the mold under a first elevated temperature and under vacuum for a time sufficient to allow the composition to wet the preform; and (c) exposing the mold containing the composition wetted-preform to a second elevated temperature while under vacuum sufficient to cure the heat curable composition-wetted preform within the mold to form a VaRTM product.

In yet another aspect, there is provided a RFI process, steps of which include:

(a) providing a preform into a closed mold containing a heat curable composition in film form;

(b) exposing the interior of the mold to a first elevated temperature and optionally vacuum, while the exterior of the mold is exposed to an elevated pressure, for a time sufficient to infuse the preform with the heat curable composition; and (c) curing the heat curable composition-infused preform within the mold at a second elevated temperature to form a RFI product.

In each of these process the heat curable composition comprises (i) a benzoxazine component.

Of course, the invention provides products, such as RFI, RTM and VaRTM products, made by these advanced processes.

In still another aspect, the invention provides a binder composition, which is useful in both the RTM and VaRTM processes. The inventive binder composition is partially cured by exposure to elevated temperature conditions over time sufficient to increase the melting point higher than the temperature at which a matrix resin composition is to be infused into a preform and lower than the point at which the partially cured binder composition and the matrix resin composition are miscible.

Complex three dimensional part geometries may be molded in the advanced processes described herein as a single piece unit. RFI, for instance, is particularly useful for molding large composite parts, as it defines the entire geometry of the part in a single process cycle, thereby eliminating any subsequent assembly or bonding processes. In the aerospace industry, for one, it is not uncommon for parts to be up to 100 feet in length and up to 30 feet in width, located on lofted surfaces with integral stiffening and attachment details. Using these advanced processes to form such large parts, assembly and tooling costs normally associated with a mechanically fastened or bonded structure may be reduced. In addition, narrow engineering tolerances may be realized using these advanced processes to enable assembly of a large aircraft structure with minimal shimming, typically associated with non-monolithic components constructed from sub-assemblies.

In an RFI process, a resin film molding tool is ordinarily used, which includes an outer mold tool, which includes a facing sheet supported by a support structure. A resin film prepared from a benzoxazine is positioned on the facing sheet, and a preform is positioned on the resin film. The preform is designed in the shape of a desired article to be fabricated from compositing materials, such as fibers made from carbon, aramid, ceramic and the like. The preform may include a preform skin, as described in U.S. Pat. No. 5,281, 388, the disclosure of which is hereby expressly incorporated herein by reference.

RTM systems are well known, such as those described in U.S. Pat. Nos. 5,369,192, 5,567,499, 5,677,048, 5,851,336, and 6,156,146, which are incorporated herein by reference. VaRTM systems are also well known, such as those described in U.S. Pat. Nos. 5,315,462, 5,480,603 and 5,439,635, which also expressly are incorporated herein by reference.

RTM systems produce composite articles from resin impregnated preforms. The preform is placed in a cavity mold. A benzoxazine-containing heat curable composition is then injected into the mold to wet and infuse the fibers of the preform. In an RTM process, the benzoxazine-containing heat curable composition is introduced into the cavity mold under pressure. The benzoxazine-containing heat curable composition-infused preform is cured under elevated temperature. The resulting solid article may be subjected to post curing operations to produce a final composite article, though this is not required.

Thus, with the RTM process, the preform is placed, within the mold. The preform used in the RTM process may include a benzoxazine-containing heat curable binder composition, tacked to the fibers which make up the preform.

In an RTM process, therefore, the mold is then closed and the benzoxazine-containing heat curable composition is introduced, and allowed to infuse the preform. This introduction may occur under mildly elevated temperature conditions to improve flow characteristics of the benzoxazine-containing heat curable composition for a time sufficient to allow wetting of the preform.

The interior of the mold is then heated to and maintained at, a temperature (ordinarily within the range of 250° F. to 350° F.) which is sufficient to cure the benzoxazine-containing heat curable composition, for a time sufficient to cure the heat curable composition. This time is ordinarily within the 60 to 180 minute range, depending of course on the precise constituents of the heat curable composition. After cure is complete, the temperature of the mold is allowed to cool and the RTM product made by the process is removed.

In a VaRTM process, after providing the preform, a dispersing medium may be disposed thereover. The dispersing medium is positioned on the surface of prefrom in an envelope within the mold. The dispersing medium is oftentimes an open weave fabric. The vacuum is applied to collapse the dispersing medium against the preform and assist in the introduction of the benzoxazine-containing heat curable composition into the mold to wet and infuse the preform.

The benzoxazine-containing heat curable composition is injected into the mold, and allowed to wet and infuse the preform. This injection may again occur under a mildly elevated temperature, this time through and under vacuum for a period of time sufficient to allow the composition to wet and infuse the preform.

The benzoxazine-containing heat curable composition is introduced under vacuum into the envelope to wet and infuse the preform. The vacuum is applied to the interior of the envelope via a vacuum line to collapse the flexible sheet against the preform. The vacuum draws the benzoxazine-containing heat curable composition through the preform and helps to avoid the formation of air bubbles or voids in the finished article. The benzoxazine-containing heat curable composition cures while being subjected to the vacuum.

The mold is then exposed to an elevated temperature, ordinarily within the range at 250° F. to 350° F., while remaining under vacuum, for a period of time sufficient to cure the heat curable composition-wetted preform within the mold. This time period again is ordinarily within the 60 to 180 minute range. The vacuum also draws off any fumes produced during the curing process. After cure is complete, the temperature of the mold is allowed to cool and the VaRTM product made by the process is removed.

For these advanced processes, the benzoxazine-containing heat curable composition has a viscosity in the range of 10 to 5000 cps at resin injection temperature (10 to 3000 cps for RTM or VaRTM; 10-5000 cps for RFI). In addition, the time within which the viscosity of the heat curable composition increases by 100% under the process conditions is in the range of 1 to 10 hours.

The resulting solid article so made by the VaRTM process may be subjected to post curing operations to produce a final composite article.

The first step in either of the RTM/VaRTM processes is thus to fabricate a fiber preform in the shape of the desired article. The preform generally includes a number of fabric layers or plies made from these fibers that impart the desired reinforcing properties to a resulting composite article. Once the fiber preform has been fabricated, the preform is placed in a mold.

The benzoxazine of the heat curable composition may be embraced by the following structure:

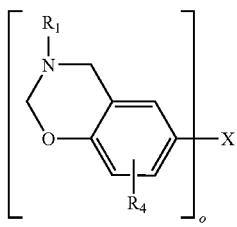

I where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from hydrogen, alkyl, alkenyl and aryl, and $R_4$ is selected from hydrogen, halogen, alkyl and alkenyl.

More specifically, the benzoxazine may be embraced by the following structure:

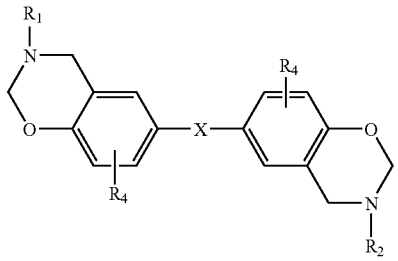

II where X is selected from of a direct bond, $CH_2$, $C(CH_3)_2$, C=O, S, S=O and O=S=O, $R_1$ and $R_2$ are the same or different and are selected from hydrogen, alkyl, such as methyl, ethyl, propyls and butyls, alkenyl, such as allyl, and aryl and $R_4$ are the same or different and are selected from hydrogen or allyl.

Representative benzoxazines include:

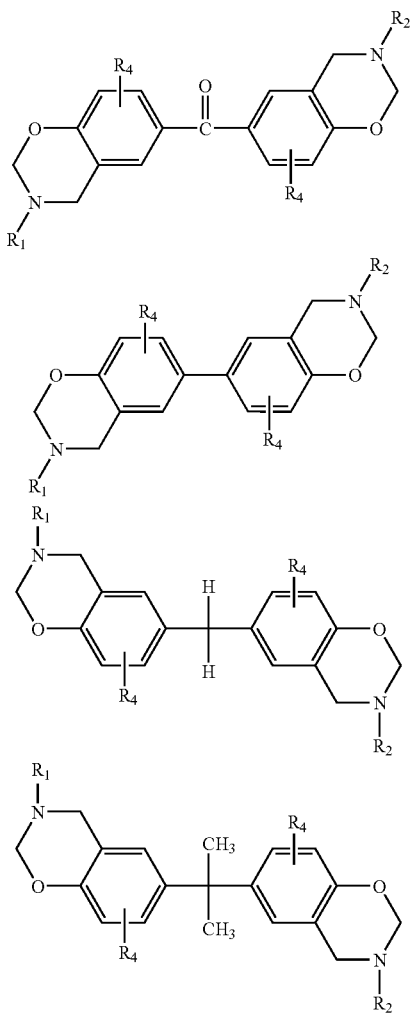

where $R_1$, $R_2$ and $R_4$ are as defined above.

Alternatively, the benzoxazine may be embraced by the following structure:

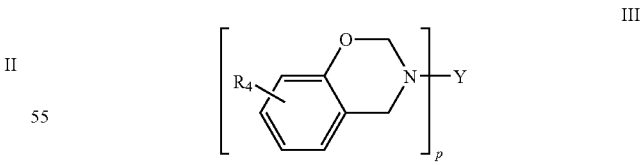

III where p is 1-4, Y is selected from the group consisting of biphenyl (when p is 2), diphenyl methane (when p is 2) and derivatives thereof (such as alkylated diphenyl methanes like tetra methyl, tetra ethyl, tetra isopropyl, dimethyl/diethyl and the like), diphenyl ethyl (when p is 2), diphenyl isopropane (when p is 2), diphenyl sulfide (when p is 2), diphenyl sulfoxide(when p is 2), diphenyl sulfone (when p is 2), and diphenyl ketone (when p is 2), and $R_4$ is selected from hydrogen, halogen, alkyl and alkenyl.

Though not embraced by structures I, II or III additional benzoxazines are within the following structures:
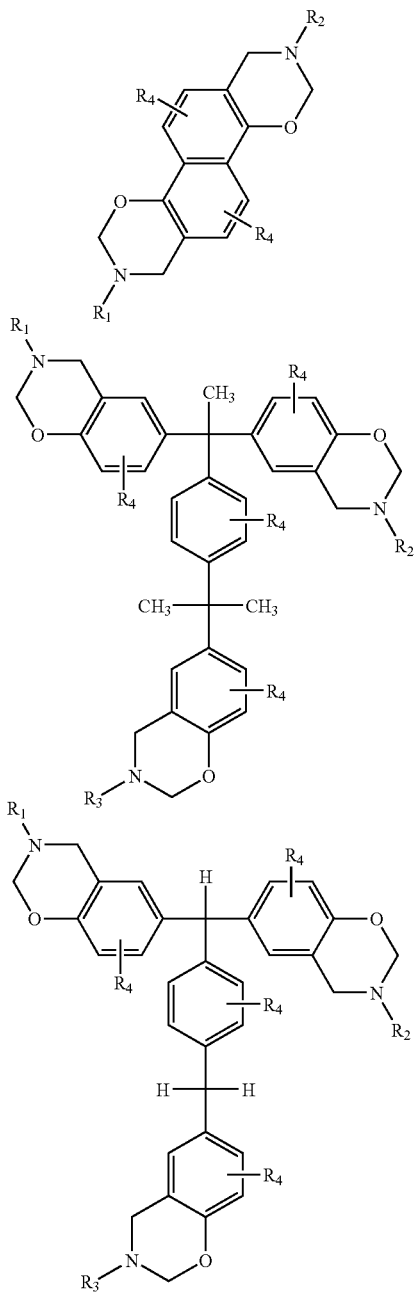
IV
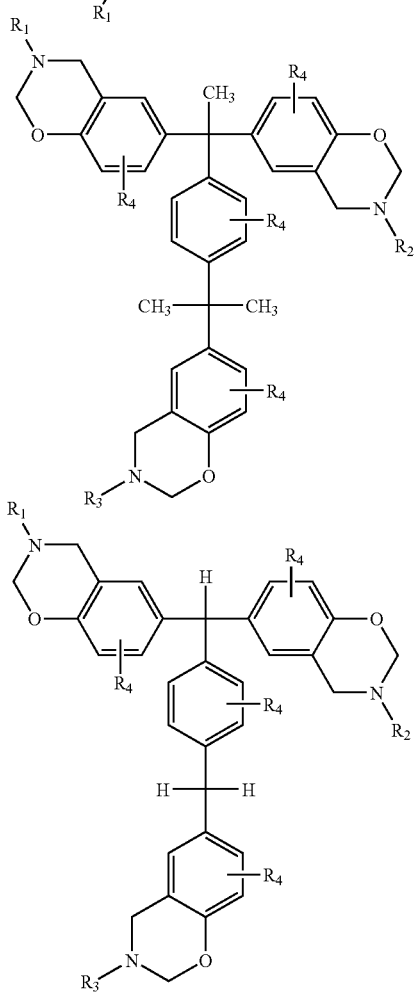
V
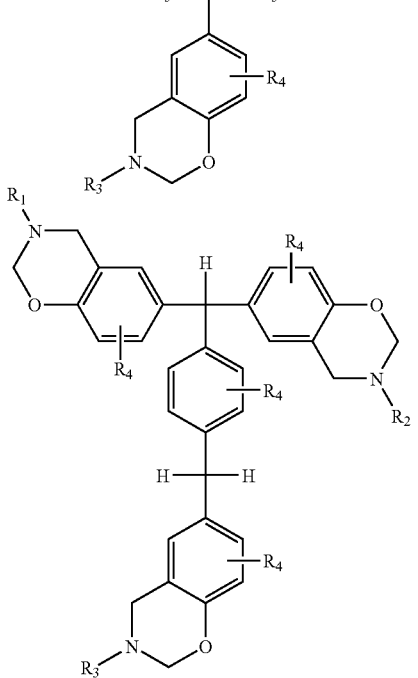
VI
where $R_1$, $R_2$ and $R_4$ are as defined above, and $R_3$ is defined as $R_1$ $R_2$ or $R_4$.
Examples of these benzoxazines therefore include:
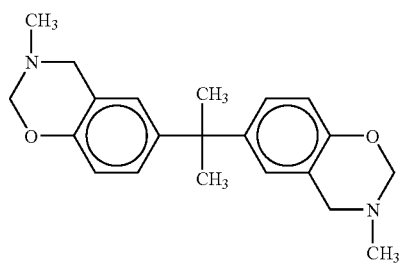
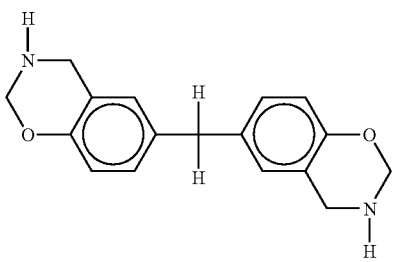
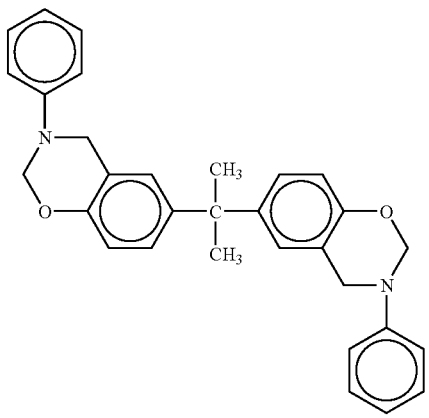
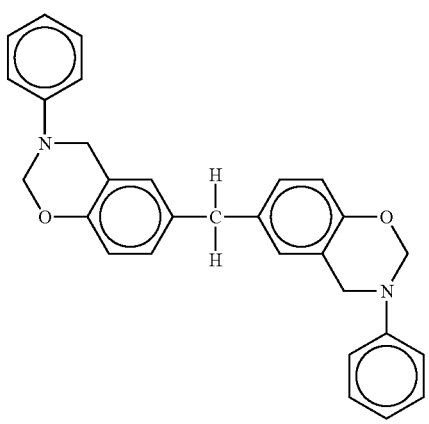
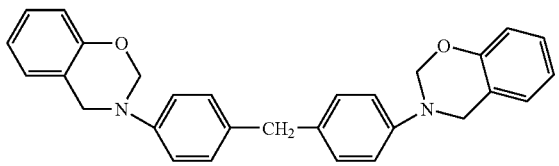
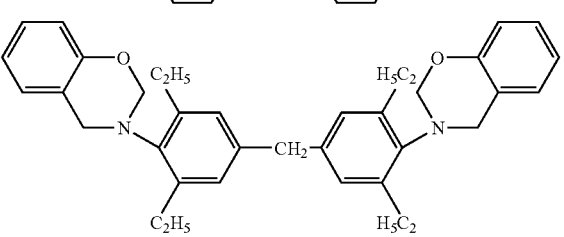
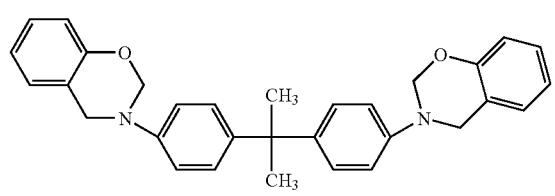

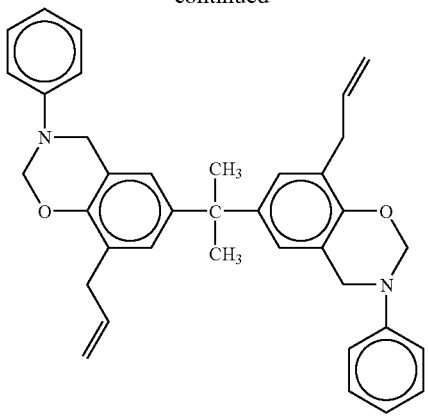

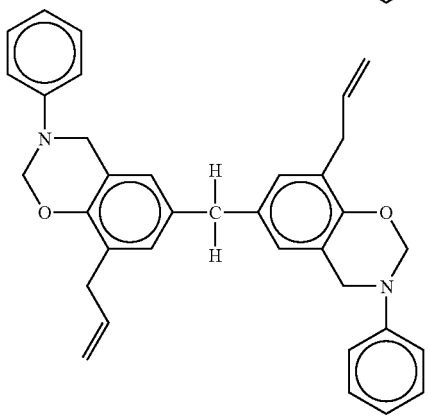

The benzoxazine component may include the combination of multifunctional benzoxazines and monofunctional benzoxazines. Examples of monofunctional benzoxazines may be embraced by the following structure:

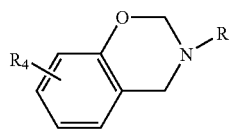

where R is alkyl, such as methyl, ethyl, propyls and butyls, or aryl, and $R_4$ is selected from hydrogen, halogen, alkyl and alkenyl.

Eamples of such a monofunctional benzoxazine are:

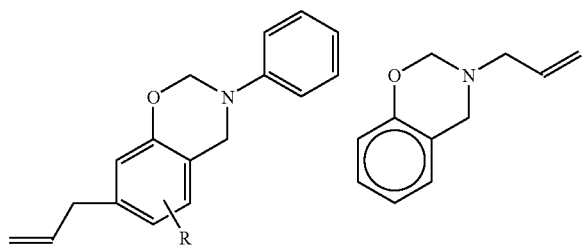

The benzoxazine component should be present in an amount in the range of about 10 to about 99 percent by weight, such as about 25 to about 75 percent by weight, desirably about 35 to about 65 percent by weight, based on the total weight of the composition. In the event that a monofunctional benzoxazine is present as well, the monofunctional benzoxazine may be present in an amount in the range of about 0 to about 90 percent by weight, such as about 10 to about 80 percent by weight, more desirably about 25 to about 60 percent by weight, based on the total weight of the benzoxazine component—that is, the monofunctional benzoxazine and multifunctional benzoxazine.

In one version of the heat curable composition, the benzoxazine component may also include (ii) a toughener component comprising acrylonitrile-butadiene co-polymer having secondary amine terminal groups.

This toughener component should be present in an amount in the range of about 1 to about 90 percent by weight, such as about 10 to about 70 percent by weight, desirably about 15 to about 30 percent by weight, based on the total weight of the composition.

In another version of the heat curable composition; the benzoxazine component may also include
  (ii) an epoxy or episulfide component;
  (iii) optionally, one or more of an oxazoline component, a cyanate ester component, a phenolic component, and a thiophenolic component;
  (iv) optionally, acrylonitrile-butadiene co-polymer, a polyimide component, and a polyimide/siloxane component; and
  (v) optionally, a curative.

The epoxy or episulfide component should be present in an amount in the range of about 5 to about 60 percent by weight, such as about 10 to about 50 percent by weight, desirably about 15 to about 35 percent by weight, based on the total weight of the composition.

The oxazoline component, the cyanate ester component, the phenolic component, and the thiophenolic component should be present in an amount in the range of about 5 to about 60 percent by weight, such as about 10 to about 50 percent by weight, desirably about 15 to about 35 percent by weight, based on the total weight of the composition.

The acrylonitrile-butadiene co-polymer, polyimide component, and the polyimide/siloxane component should be present in an amount in the range of about 1 to about 50 percent by weight, such as about 5 to about 35 percent by weight, desirably about 10 to about 25 percent by weight, based on the total weight of the composition.

The curative should be present in an amount in the range of about 0.01 to about 40 percent by weight, such as about 0.5 to about 20 percent by weight, desirably about 1 to about 15. percent by weight, based on the total weight of the composition.

The binder composition, which may be used in the RTM or VaRTM process, includes a solid benzoxazine component, which is partially cured by exposure to elevated temperature conditions over time sufficient to increase the melting point higher than the temperature at which a matrix resin composition is to be infused into a preform and lower than the point at which the partially cured binder composition and the heat curable composition are miscible. The binder composition may also include a spacer selected from particles constructed of thermoplastics, rubbers, metals, carbon, core shell, ceramics and combinations thereof.

Like the heat curable composition, the binder composition may include a toughener component comprising an acrylonitrile-butadiene co-polymer component (such as acrylonitrile-butadiene co-polymer having secondary amine terminal groups), polyimide component, and a polyimide/siloxane component; and/or an optional, epoxy resin or episulfide resin component; an optional, one or more of an oxazoline component, a cyanate ester component, a phenolic component, and a thiophenolic component; and an optional curative.

EXAMPLES

Example 1

In this example, a formulation suitable for use as a thick film in an RFI process (such as 0.20 pounds/ft² areal weight or 30 mils thickness), or as a resin for VaRTM and RTM is illustrated.

The formulation included an approximate 1:1 mixture of benzoxazines based on bisphenol F and thiodiphenol at a 68 weight percent; cycloaliphatic epoxy resin (CY 179, commercially available from Vantico) at a 23 weight percent; and ATBN (1300X16, commercially available from Noveon, Cleveland, Ohio) at a 9 weight percent, based on the total formulation. The components can be added to one another in any convenient order, and mixed at room temperature for a time sufficient to generate a substantially homogenous mixture.

The formulation so formed may be used in an RTM process, for instance, as follows:
  Preheat the formulation to a temperature of 160° F.
  Insert a preform into a closed mold
  Preheat the mold to a temperature of 250° F.
  Apply vacuum to the mold for a period of time of 1 hour to remove any volatiles from the preform
  Preheat resin injector to a temperature of 235° F.
  Add the preheated formulation to the injector
  When the formulation equilibrates at a temperature of 250° F., apply full vacuum for a period of time of 15 minutes to remove air
  Release the vacuum
  Inject the formulation at about the rate of 5 to 200 cc per minute using about 20 psi injection pressure, which may be increased, if desired throughout the injection to maintain the desired flow rate
  When the preform is fully impregnated, close the mold resin exit ports
  Pressurize the tool to 100 psi and hold at that pressure for a period of time of about 10 minutes
  Ramp the mold temperature to 350° F. at 3° F. per minute
  When the formulation has gelled, remove the applied pressure
  Hold the temperature at 350° F. for a period of time of 3 hours
  Cool to a temperature of 120° F.
  Open the mold and remove the cured part.

The properties of the so formed cured part in the form of a panel were observed as follows using Toray T-300 3K 70 plain weave woven carbon fabric:

| | |
|---|---|
| Glass transition temperature, hot/wet, ° F. | 354 |
| Open hole compressive strength @ 75° F., ksi | 43 |
| Open hole compressive modulus @ 75° F., msi | 7.1 |
| Open hole compressive @ 180° F., wet, ° F. | 36 |
| Compression after impact @ 75° F., ksi | 33 |

Example 2

In this example, a formulation was prepared from an approximate 60:40 mixture of bifunctional benzoxazine and monofunctional benzoxazine, each based on formaldehyde, phenol and aniline at a 75 weight percent, and cycloaliphatic epoxy resin (CY 179) at a 25 weight percent, based on the total formulation. As in Example 1, the components can be added to one another in any convenient order. Here, however, the components were mixed at an elevated termperature in the range of 160° F. to 180° F. for a time sufficient to generate a substantially homogenous mixture.

The formulation so formed may be used in an RTM, with a injection temperature in the range of from 180° F. to 250° F., with an injection window of at least 4 hours. The formulation can be cured at a temperature of 350° F. for a period of time of 2 hours.

The properties of the so formed cured part in the form of a panel were observed as follows using Cramer 445 Fabric, and conditioned as noted:

| Property | Conditioning | Test Conditions | Values |
|---|---|---|---|
| ILSS (Mpa) | MEK/RT/1 h | RT | 60 |
| | Water/100° C./2 h | 70° C. | 68 |
| | Dry | RT | 60 |
| | Dry | 120° C. | 60 |
| | 70° C./85% RH | 70° C. | 68 |
| $T_g$, onset (° C.) | Dry | N/A | 190 |
| | 70° C./85% RH | N/A | 170 |
| IPS strength (Mpa) | Dry | RT | 112 |
| IPS modulus (Gpa) | Dry | RT | 4.9 |
| CAI (Mpa) | Dry | RT | 227 |

Here, ILSS is interlaminar sheer strength, MEK is methyl ethyl ketone and CAI is compression after impact.

What is claimed is:

1. A resin transfer molding process, steps of which comprise:
    (a) providing a heat curable composition into a closed mold containing a preform having a binder composition in contact therewith;
    (b) exposing the interior of the mold to a first elevated temperature and elevated pressure sufficient to wet the preform with the heat curable composition; and
    (c) curing the heat curable composition-impregnated preform within the mold at a second elevated temperature to form a resin transfer molded product, wherein the heat curable composition comprises (i) a benzoxazine component and. wherein the binder composition comprises a solid benzoxazine component, which is partially cured by exposure to elevated temperature conditions over time sufficient to increase the melting point higher than the temperature at which the heat curable composition is to be infused into a preform and lower than the point at which the partially cured binder composition and the heat curable composition are miscible.

2. The resin transfer molding process of claim 1, wherein the heat curable composition further comprises (ii) a toughener component comprising acrylonitrile-butadiene co-polymer having secondary amine terminal groups.

3. The resin transfer molding process of claim 1, wherein the heat curable composition further comprises:
    (ii) an epoxy or episulfide component;
    (iii) optionally, one or more of an oxazoline component, a cyanate ester component, a phenolic component, and a thiophenolic component;
    (iv) optionally, an acrylonitrile-butadiene co-polymer, a polyimide component, and a polyimide/siloxane component; and
    (v) optionally, a curative.

4. The resin transfer molding process of claim 1, wherein the heat curable composition has a viscosity in the range of 10 to 3000 centipoise at the resin injection temperature.

5. The resin transfer molding process of claim 1, wherein the time within which the viscosity of the heat curable composition increases by 100% under the process conditions is in the range of 1 to 10 hours at the injection temperature.

6. The resin transfer molding process of claim 1 wherein the plurality of fabric plies or unidirectional plies comprises fibers selected from glass, carbon, aramid and ceramics.

7. A resin transfer molded product made by the process of claim 1.

8. A resin transfer molding preform comprising:
 (a) a plurality of fabric plies or unidirectional plies and
 (b) a heat curable binder composition, tacked to the plurality of fabric plies or unidirectional plies, wherein the heat curable binder composition comprises (i) a benzoxazine component and wherein the binder composition comprises a solid benzoxazine component, which is partially cured by exposure to elevated temperature conditions over time sufficient to increase the melting point higher than the temperature at which the heat curable composition is to be infused into a preform and lower than the point at which the partially cured binder composition and the heat curable composition are miscible.

9. The resin transfer molding preform of claim 8, wherein the heat curable binder composition further comprises (ii) a toughener component comprising acrylonitrile-butadiene co-polymer having secondary amine terminal groups.

10. The resin transfer molding preform of claim 8, wherein the heat curable binder composition further comprises:
 (ii) an epoxy or episulfide component;
 (iii) optionally, one or more of an oxazoline component, a cyanate ester component, a phenolic component, and a thiophenolic component;
 (iv) optionally, an acrylonitrile-butadiene co-polymer, a polyimide component, and a polyimide/siloxane component; and
 (v) optionally, a curative.

11. The resin transfer molding preform of claim 8, wherein the heat curable binder composition further comprises optionally, a spacer selected from the group consisting of particles constructed of thermoplastics, rubbers, metals, carbon, core shell, ceramics and combinations thereof.

12. The resin transfer molding preform of claim 8, wherein the plurality of fabric plies or unidirectional plies comprises fibers selected from glass, carbon, aramid and ceramics.

13. A vacuum assisted resin transfer molding process, steps of which comprise:
 (a) providing a preform into a mold, wherein the perform has a binder composition in contact therewith;
 (b) providing a heat curable composition into the mold under a first elevated temperature and under vacuum for a time sufficient to allow the composition to wet the preform; and
 (c) exposing the mold containing the composition wetted-preform to a second elevated temperature while under vacuum sufficient to cure the heat curable composition-wetted preform within the mold to form a resin transfer molded product, wherein the heat curable composition comprises (i) a benzoxazine component and wherein the binder composition comprises a solid benzoxazine component, which is partially cured by exposure to elevated temperature conditions over time sufficient to increase the melting point higher than the temperature at which the heat curable composition is to be infused into a preform and lower than the point at which the partially cured binder composition and the heat curable composition are miscible.

14. The vacuum assisted resin transfer molding process of claim 13, wherein after providing the preform a dispersing medium is provided thereover.

15. The vacuum assisted resin transfer molding process of claim 13, wherein the heat curable composition further comprises (ii) a toughener component comprising acrylonitrile-butadiene co-polymer having secondary amine terminal groups.

16. The vacuum assisted resin transfer molding process of claim 13, wherein the heat curable composition further comprises:
 (ii) an epoxy or episulfide component;
 (iii) optionally, one or more of an oxazoline component, a cyanate ester component, a phenolic component, and a thiophenolic component;
 (iv) optionally, an acrylonitrile-butadiene co-polymer, a polyimide component, and a polyimide/siloxane component; and
 (v) optionally, a curative.

17. The vacuum assisted resin transfer molding process of claim 13, wherein the heat curable composition has a viscosity in the range of 10 to 2000 centipoise at transfer molding temperature.

18. The vacuum assisted resin transfer molding process of claim 13, wherein the time within which the viscosity of the heat curable composition increases by 100% under the process conditions is in the range of 1 to 10 hours at the resin transfer temperature.

19. The vacuum assisted resin transfer molding process of claim 13, wherein the preform comprises fibers selected from glass, carbon, aramid and ceramics.

20. A vacuum assisted resin transfer molded product made by the process of claim 13.

21. A vacuum assisted resin transfer molding preform comprising:
 (a) a plurality of fabric plies or unidirectional plies and
 (b) a heat curable binder composition, tacked to the plurality of fabric plies or unidirectional plies, wherein the heat curable binder composition comprises (i) a benzoxazine component and wherein the binder composition comprises a solid benzoxazine component, which is partially cured by exposure to elevated temperature conditions over time sufficient to increase the melting point higher than the temperature at which the heat curable composition is to be infused into a preform and lower than the point at which the partially cured binder composition and the heat curable composition are miscible.

22. The vacuum assisted resin transfer molding preform of claim 21, wherein the heat curable binder composition further comprises (ii) a toughener component comprising acrylonitrile-butadiene co-polymer having secondary amine terminal groups.

23. The vacuum assisted resin transfer molding preform of claim 21, wherein the heat curable binder composition further comprises:
 (ii) an epoxy or episulfide component;
 (iii) optionally, one or more of an oxazoline component, a cyanate ester component, a phenolic component, and a thiophenolic component;
 (iv) optionally, an acrylonitrile-butadiene co-polymer, a polyimide component, and a polyimide/siloxane component; and
 (v) optionally, a curative.

24. The vacuum assisted resin transfer molding preform of claim 21, wherein the heat curable binder composition further comprises optionally, a spacer selected from the group consisting of particles constructed of thermoplastics, rubbers, metals, carbon, core shell, ceramics and combinations thereof.

25. The vacuum assisted resin transfer molding preform of claim 21, wherein the plurality of fabric plies or unidirectional plies comprises fibers selected from glass, carbon, aramid and ceramics.

26. A resin film infusion process, steps of which comprise:
(a) providing a preform having in contact therewith a binder composition, into a closed mold containing a heat curable composition in film form;
(b) exposing the interior of the mold to a first elevated temperature and optionally vacuum, while the exterior of the mold is exposed to an elevated pressure, for a time sufficient to infuse the preform with the heat curable composition; and
(c) curing the heat curable composition-infused preform within the mold at a second elevated temperature to form a resin transfer molded product, wherein the heat curable composition comprises (i) a benzoxazine component and wherein the binder composition comprises a solid benzoxazine component, which is partially cured by exposure to elevated temperature conditions over time sufficient to increase the melting point higher than the temperature at which the heat curable composition is to be infused into a preform and lower than the point at which the partially cured binder composition and the heat curable composition are miscible.

27. The resin film infusion process of claim 26, wherein the heat curable composition further comprises (ii) a toughener component comprising acrylonitrile-butadiene co-polymer having secondary amine terminal groups.

28. The resin film infusion process of claim 26, wherein the heat curable composition further comprises:
(ii) an epoxy or episulfide component;
(iii) optionally, one or more of an oxazoline component, a cyanate ester component, a phenolic component, and a thiophenolic component;
(iv) optionally, an acrylonitrile-butadiene co-polymer, a polyimide component, and a polyimide/siloxane component; and
(v) optionally, a curative.

29. The resin film infusion process of claim 26, wherein the heat curable composition has a viscosity in the range of 10 to 5000 centipoise at the infusion temperature.

30. The resin film infusion process of claim 26, wherein the time within which the viscosity of the heat curable composition increases by 100% under the process conditions is in the range of 1 to 10 hours at the infusion temperature.

31. The resin film infusion process of claim 26, wherein the preform comprises fibers selected from glass, carbon, aramid and ceramics.

32. A resin film infused product made by the process of claim 26.

33. The resin transfer molding process of claim 1, wherein the benzoxazine of the heat curable composition comprises

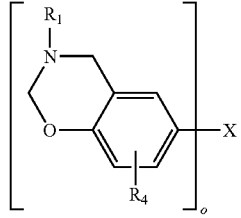

wherein o is 1-4, X is selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl and aryl, and $R_4$ is selected from hydrogen, halogen and alkyl.

34. The resin film infusion process of claim 21, wherein the benzoxazine component of the heat curable composition comprises

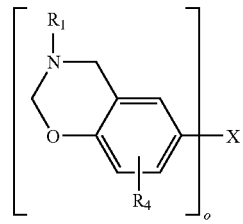

wherein o is 1-4, X is selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl and aryl, and $R_4$ is selected from hydrogen, halogen and alkyl.

35. The resin transfer molding process of claim 1, wherein the benzoxazine of the heat curable composition comprises one or more of

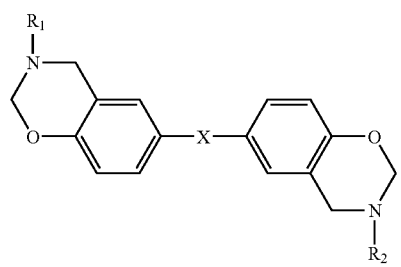

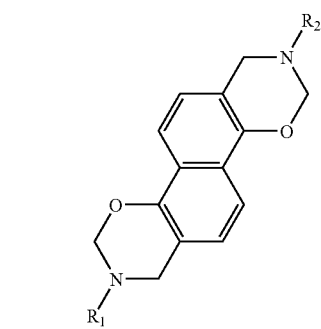

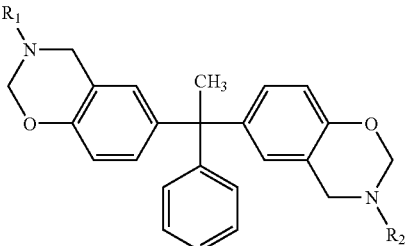

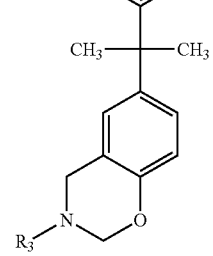

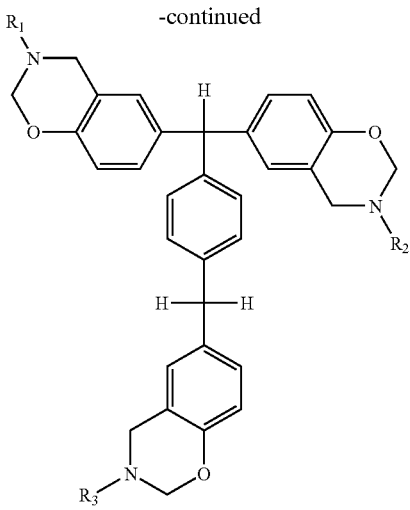

wherein X is selected from the group consisting of a direct bond, $CH_2$, $C(CH_3)_2$, C=O, S, S=O and O=S=O, and $R_1$, $R_2$ and $R_3$ are the same or different and are selected from the group consisting of hydrogen, alkyl and aryl.

36. The resin film infusion process of claim 21, wherein the benzoxazine component of the heat curable composition comprises one or more of

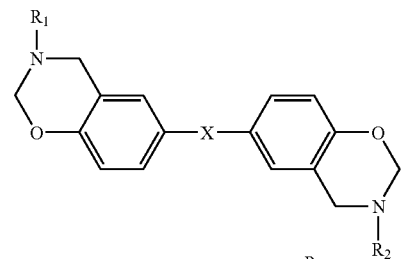

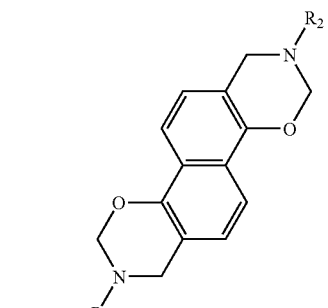

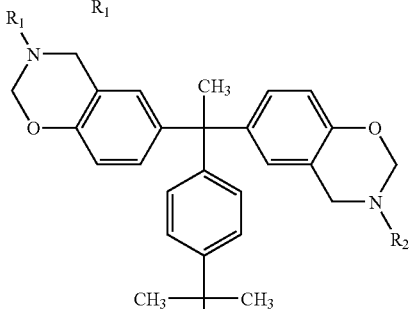

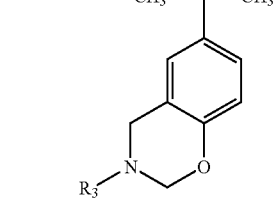

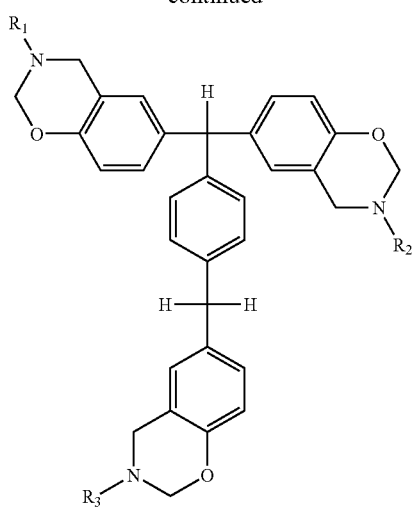

wherein X is selected from the group consisting of a direct bond, $CH_2$, $C(CH_3)_2$, C=O, S, S=O and O=S=O, and $R_1$, $R_2$ and $R_3$ are the same or different and are selected from the group consisting of hydrogen, alkyl and aryl.

37. The resin transfer molding process of claim 1, wherein the benzoxazine of the heat curable composition comprises

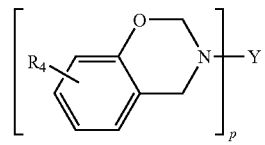

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen and alkyl.

38. The resin film infusion process of claim 21, wherein the benzoxazine component of the heat curable composition comprises

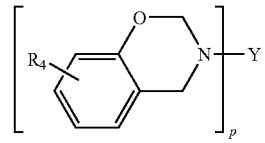

wherein p is 2, Y is selected from the group consisting of biphenyl (when p is 2), diphenyl methane (when p is 2), diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from hydrogen, halogen and alkyl.

39. The resin transfer molding process of claim 1, wherein the benzoxazine of the heat curable composition comprises one or more of

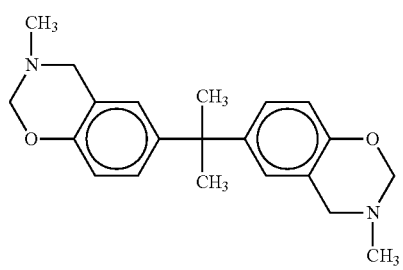
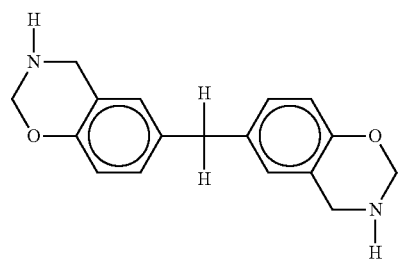
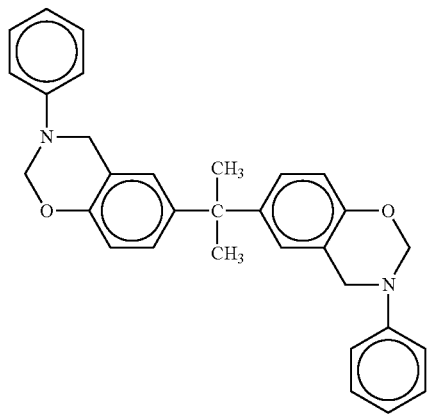
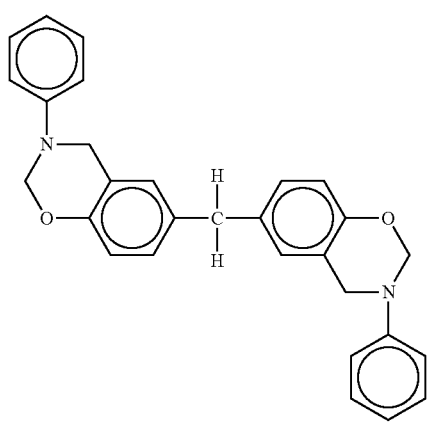
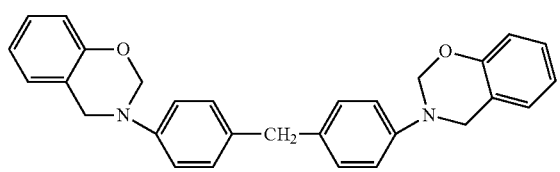
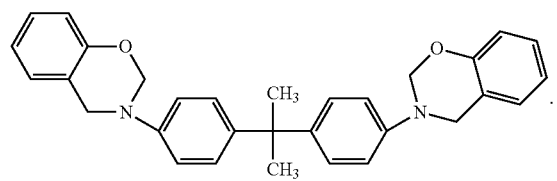
40. The vacuum assisted resin transfer molding process of claim 15, wherein the benzoxazine component of the heat curable composition comprises one or more of
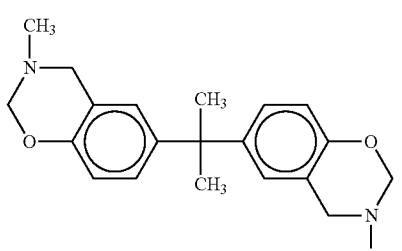
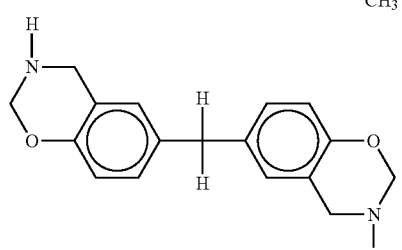
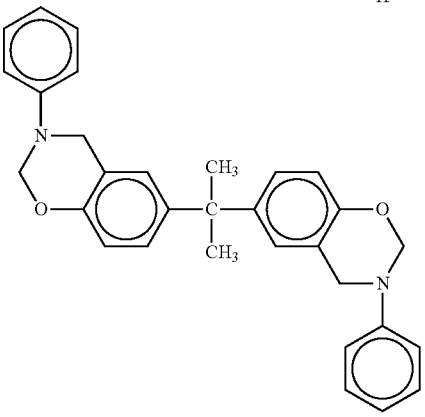
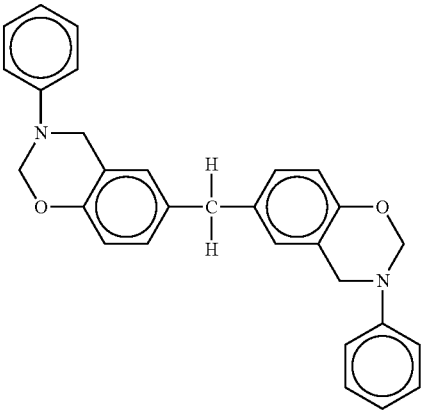

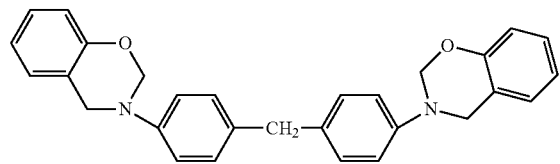
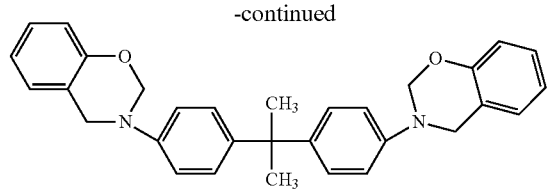
* * * * *